(12) United States Patent
Uchijima et al.

(10) Patent No.: US 6,728,935 B1
(45) Date of Patent: Apr. 27, 2004

(54) APPARATUS FOR SETTING ATTRIBUTES TO CHARACTER STRINGS AND GRAPHIC OBJECTS

(75) Inventors: Masaaki Uchijima, Toyama (JP); Tohru Morifuji, Toyama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/350,145

(22) Filed: Jul. 9, 1999

(30) Foreign Application Priority Data

Dec. 15, 1998 (JP) .......................................... 10-356786

(51) Int. Cl.$^7$ .............................................. G06F 17/24
(52) U.S. Cl. ...................................................... 715/542
(58) Field of Search ................................ 707/530, 526, 707/528, 529, 531, 542, 541; 715/530, 526, 528, 529, 531, 541

(56) References Cited

U.S. PATENT DOCUMENTS 5,522,024 A * 5/1996 Hiraga et al. ............... 345/700
6,002,402 A * 12/1999 Schacher .................... 345/810
6,088,712 A * 7/2000 Huang et al. ................ 345/700

OTHER PUBLICATIONS

Boyce et al., "Using Microsoft Office 97", copyright 1997, pp. 71–75, 111, 443–453, and 1044–1057.*

* cited by examiner

Primary Examiner—Stephen S. Hong
Assistant Examiner—Doug Hutton
(74) Attorney, Agent, or Firm—Staas & Halsey LLP (57) ABSTRACT

An apparatus for setting desired attributes to character strings and graphic objects in a document. The apparatus has a storage area, as part of a document file or as a separate history file, to store history records of attribute patterns that the user has set to the objects in a document. Each attribute pattern is composed of an attribute type and attribute option values. Upon request from the user, a display unit shows a list of the attribute patterns stored as the history records in the storage area, allowing the user to choose a desired attribute pattern from the list. A setting unit applies the attribute pattern chosen by the user to a newly entered object or one of the existing objects that has been selected in advance by the user.

23 Claims, 8 Drawing Sheets

FIG.3(A)  The quick brown fox

FIG.3(B)  The quick brown fox jumps over

FIG.3(C)  The quick brown fox jumps over the lazy dog.

FIG.3(D)

| EXAMPLE | ATTRIBUTE TYPE | ATTRIBUTE OPTIONS |
|---|---|---|
| ABC | UNDERLINE | THIN, BLACK |
| ABC | UNDERLINE | DOUBLE, RED |

FIG. 3(E)  The quick brown fox jumps over the lazy dog.

| | |
|---|---|
| NUMBER OF ENTRIES: 2 | cnt |
| ATTRIBUTE TYPE(1): UNDERLINE | attr(1) |
| ATTRIBUTE OPTION(1): THIN, BLACK | op(1) |
| ATTRIBUTE TYPE(2): UNDERLINE | attr(2) |
| ATTRIBUTE OPTION(2): DOUBLE, RED | op(2) |

| ATTRIBUTE TYPE | ATTRIBUTE OPTION |
|---|---|
| UNDERLINE | STYLE, COLOR |
| TYPEFACE | FONT (ARIAL, GOTHIC, COURIER, ETC.) |
| FONT SIZE | SIZE, DOUBLE-WIDTH, DOUBLE-HEIGHT, SUBSCRIPT, SUPERSCRIPT |
| FONT COLOR | COLOR |
| OVERSCORE | STYLE, COLOR |
| HATCHING | FILL PATTERN, COLOR |
| ROTATED/ITALIC | ANGLE |
| VOIDED | THICKNESS, COLOR |
| REVERSE | -- |
| ACCENT | STYLE, COLOR |
| CROSS OUT | STYLE, COLOR |
| SHADOW | SHADOW PATTERN, COLOR |
| BOX | STYLE, COLOR |
| BORDER | STYLE, COLOR |

FIG.8(A)
- SIZE: COORDINATES OF THREE VERTEXES
- LINE TYPE: THICKNESS, COLOR
- HATCHING: FILL PATTERN, COLOR

FIG.8(B)
- SIZE: CENTER COORDINATE, RADIUS
- LINE TYPE: THICKNESS, COLOR
- HATCHING: FILL PATTERN, COLOR

FIG.8(C)
- SIZE: COORDINATES OF FOUR VERTEXES
- LINE TYPE: THICKNESS, COLOR
- HATCHING: FILL PATTERN, COLOR

FIG.8(D)
- SIZE: CENTER COORDINATE, RADIUS
- LINE TYPE: THICKNESS, COLOR
- HATCHING: FILL PATTERN, COLOR

APPARATUS FOR SETTING ATTRIBUTES TO CHARACTER STRINGS AND GRAPHIC OBJECTS

BACKGROUND OF THE INVENTION

1. Field of the Invention

The present invention relates to an apparatus for setting attributes to character strings and graphic objects. More particularly, the present invention relates to an attribute setting apparatus which permits repeated use of the same attributes for a plurality of objects in a document in a simple and reliable manner.

2. Description of the Related Art

With word processing applications running on a computer, one can add various visual effects (e.g., font, style, color, size, underline) to characters that he/she has entered through a keyboard. Typically, such formatting options are specified through the following steps: (1) selecting specific part of entered character strings to which the user wishes to set his/her desired character attributes, (2) choosing an attribute type from a menu, and (3) selecting or typing a desired option value(s). As another method to obtain the same results, the user may find and select an existing character string where the desired attributes are present, and then copy and paste the character attributes, together with the selected character string.

When writing a document, the user often encounters such a situation where he/she needs to repeat the same attribute that was once used at some other part of the text. Conventional systems are inconvenient in this situation, since he/she has to select again the same menu item and enter option values. As the applications are revised to introduce more sophisticated functions, an increasing number of attributes and options become available. However, the outward appearance of a character string may not always tell the user what attribute parameters are being specified there. This means that it is hard for the user to identify exact attribute types and values from the appearance of text, and thus the user feels it burdensome to select correct menu items to specify the same attributes.

An alternative method for repetitive use of the same attributes is to copy the desired attribute from an existing object. Although this method is advantageous in that the user can set the same attribute without the need to know exact values of attribute parameters, it is still inconvenient in the case that the replicated attributes include some unnecessary ones. Since attributes cannot always be identified from appearance, as mentioned above, it is not easy for the user to remove unnecessary attributes selectively.

The above problems in repeated use of character attributes would also apply to handling of graphic objects. Figures such as rectangles and circles may have different appearances, depending on some attribute parameters that define line styles, line thickness, fill patterns, etc. The user feels it difficult to set the same attributes to graphic objects, as in the case of character strings.

SUMMARY OF THE INVENTION

Taking the above into consideration, an object of the present invention is to provide an apparatus and a computer program for setting the same attributes to a plurality of character strings and/or graphic objects in a simple and reliable manner.

To accomplish the above object, according to the present invention, there is provided an attribute setting apparatus for setting desired attributes to objects in a document. This apparatus has a storage area, as part of a document file or as a separate history file, for storing history records of attribute patterns that the user has set to the existing objects. Each attribute pattern is composed of an attribute type and attribute option values. Upon request from the user, a display unit shows a list of attribute patterns stored as history records in the storage area, allowing the user to choose a desired attribute pattern from the list. An attribute setting unit applies the attribute pattern chosen by the user to a newly entered object or one of the existing objects that is selected in advance by the user. This processing mechanism of the attribute setting apparatus is actually implemented as software functions of a computer system and encoded in a computer program. For distribution to users, the program is stored in a computer-readable storage medium.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Preferred embodiments of the present invention will be described below with reference to the accompanying drawings.

Figure 1A:
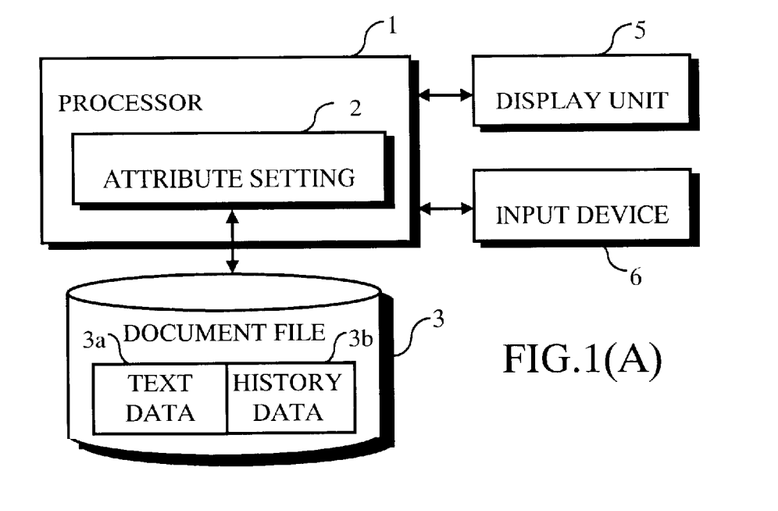
FIG. 1(A) is a system block diagram which shows an attribute setting apparatus of the present invention.

FIG. 1(A) is a system block diagram which shows an attribute setting apparatus of the present invention. In this FIG. 1(A), the processor 1 serves as a computer platform to execute an attribute setting process according to the present invention. Various features of the present invention are provided in the form of a program stored in a computer-readable medium (not shown). The processor 1 executes this attribute setting program after loading it into the processor's main storage (not shown), thus functioning as the attribute setting apparatus of the present invention.

The processor 1 comprises an attribute setting unit 2, a document file 3, a display unit 5, and an input device 6. With the display unit 5 and input device 6 (e.g., keyboard), the user interacts with the apparatus, viewing and entering various data and instructions to manipulate "objects" in a document. It should be noted here that the "objects" may include individual characters, character strings, and other symbols appearing in ordinary documents. They also include graphic objects, or figures, as will be described in a later section. "Attributes" are object properties which determine the appearance of an object and provide some special visual effects. Each attribute is defined as a combination of a specific attribute type and relating values. In general, one or more optional attribute values are available for each attribute type, and therefore, they are called "attribute options" in the present description. Combining of attribute types and their respective attribute options will yield a variety of attribute patterns. The attribute setting unit 2 permits the user to choose a specific attribute pattern from among those listed on a screen of the display unit 5 and applies it to desired objects that he/she has selected in advance or entered through the input device 6. The details of the attribute setting unit 2 will be explained later with reference to FIG. 2.

The document file 3 is a data file that contains a document, including character strings, symbols, and figures, composed by the user. Actually, the document file 3 is divided into two parts: text data 3a and history data 3b. The text data 3a contains the text part of a document, as well as attributes that modify the text, while the history data 3b serves as a storage area for history records of attributes that the user has set in the document. Being associated with the text data 3a, the history data 3b provides a complete collection of attribute patterns that have been used in the document. When the user wishes to set an attribute to a newly entered character string in the same way as he/she has done somewhere in the present text, the proposed attribute setting apparatus shows a list of all the past attribute patterns, allowing him/her to choose one of them. This feature helps the user to reuse the same attributes for modifying other objects quickly and conveniently.

Figure 1B:
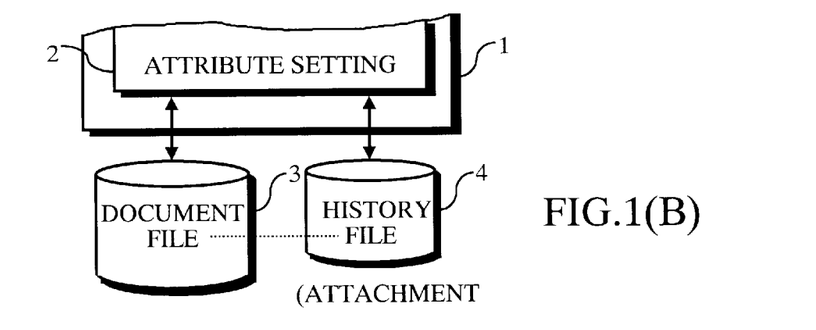
FIGS. 1(B) and 1(C) are partial block diagrams which show other possible configurations of the apparatus.
Figure 1C:
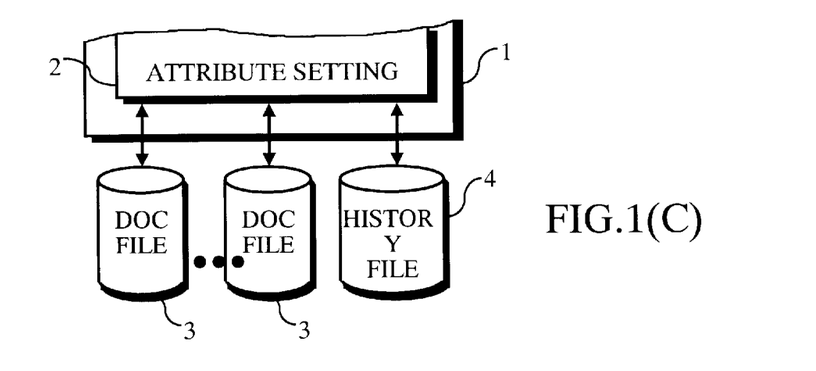

FIGS. 1(B) and 1(C) show two possible variations of the apparatus shown in FIG. 1(A). That is, the history data 3b can be stored in a separate file attached to the document file 3, as shown in FIG. 1(B). Another alternative is to store the history data 3b in an independent history file 4 as shown in FIG. 1(C), which contains all attributes used in a plurality of document files 3. Basically, such differences in file structure would not affect the proposed attribute history functions, a primary feature of the present invention. While the following explanation assumes the configuration of FIG. 1(A), one skilled in the art would appreciate that the systems shown in FIGS. 1(B) and 1(C) operate in a similar way.

Referring now to a flowchart of FIG. 2, the operation of the proposed attribute setting apparatus will be described below.

(S1) At the outset, the processor 1 creates a storage area for history data 3b so as to record attribute patterns that the user specifies.

(S2) The user enters character strings through a keyboard. Simultaneously, the processor 1 displays the entered character strings on the display unit 5.

(S3) The processor 1 checks whether the user is requesting reference to the attribute history records. More specifically, when the user wishes to add a special effect on a character string entered in step S2, he/she is allowed to call up an attribute pattern list containing past attribute patterns and select a specific attribute pattern from them by choosing a menu item or pressing a button that corresponds to a desired item in the list. The processor 1 determines whether the user has requested such an operation, and proceeds to step S6 if the result is "YES." If it is "NO," then the processor 1 executes step S4.

(S4) The user may set an attribute in an ordinary way, without using the attribute pattern list. If this is the case, the processor 1 applies the specified attribute type and option value to a specified character string in the text.

Figure 2:
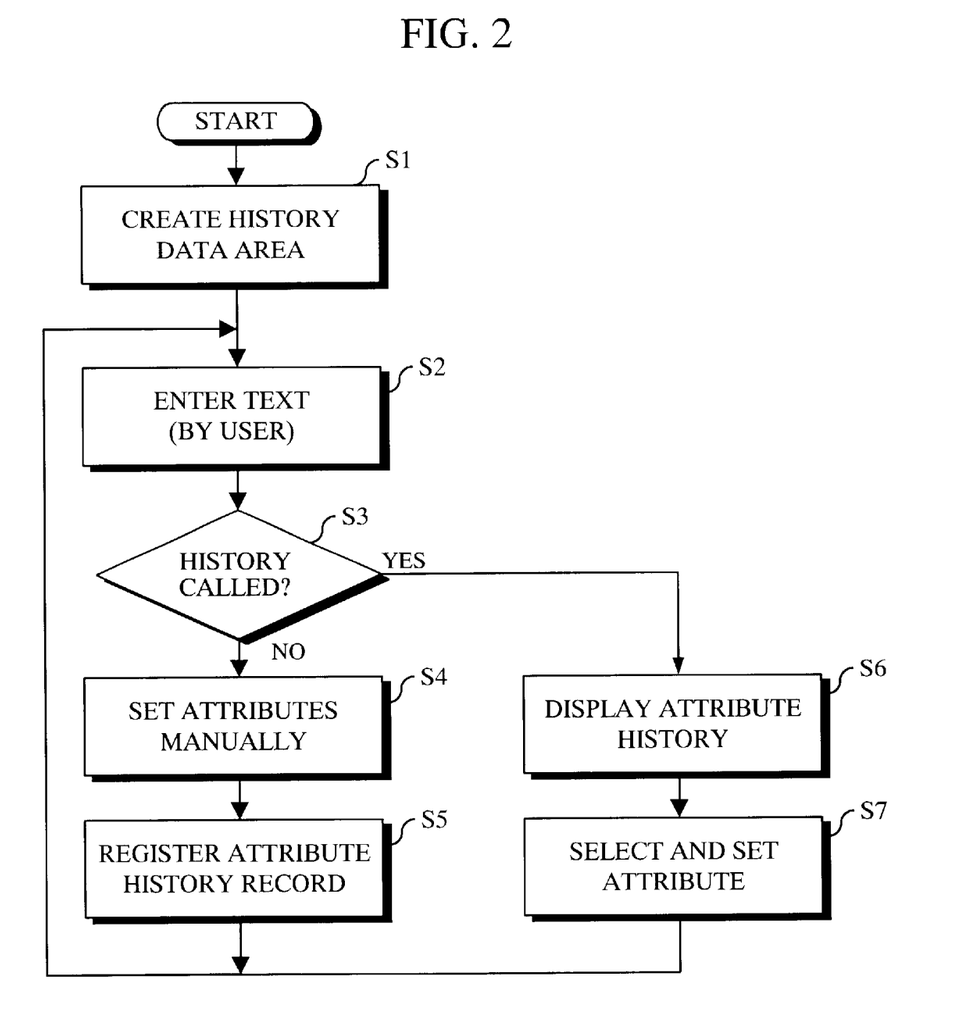
FIG. 2 is a flowchart which explains the operation of the present invention.

(S5) The processor 1 then registers a record of the attribute pattern as an additional entry of the history data 3b and exits from the process of FIG. 2.

(S6) Now that it has determined in step S3 that the user wishes to view the history data 3b, the processor 1 creates the requested attribute pattern list from the history data 3b and displays it on the display unit 5.

(S7) The user selects a desired attribute pattern from among those displayed on the display unit 5. In response to the user's action, the processor 1 applies the selected attribute type and option value(s) to a specified character string in the text.

As described above, the attribute setting apparatus is designed to display a list of attribute patterns to prompt the user to select one of them, when he/she attempts to modify a character string that is entered or selected on the monitor screen. The selected attribute pattern is then applied to the destination character string, and the text on the monitor screen is updated accordingly. This feature of the present invention makes it possible for the user to set the same attributes to other objects quickly and conveniently.

Figure 3A:
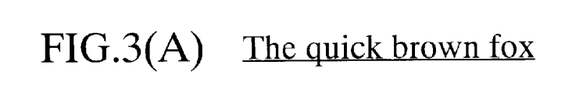
FIGS. 3(A) to 3(E) are diagrams which illustrate how to set character attributes in the present invention.
Figure 3B:
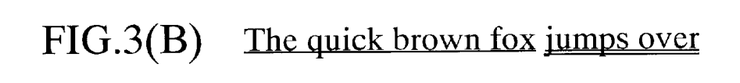
Figure 3C:
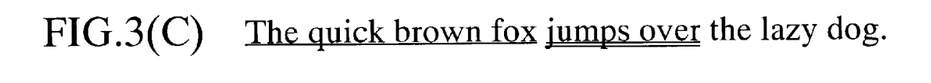
Figure 3D:
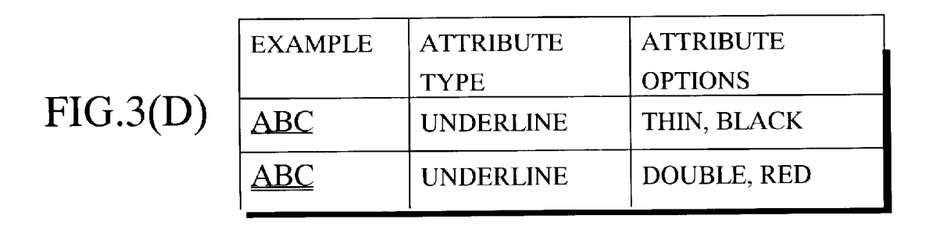
Figure 3E:
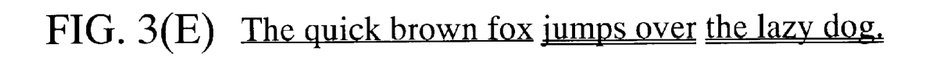

FIGS. 3(A) to 3(E) show an example to explain how attributes are set to character strings in the present invention. Referring to FIG. 3(A), the user starts with a phrase "The quick brown fox" and adds an underline to it by giving an attribute "Underline (Thin, Black)." FIG. 3(B) shows that he/she then enters the next phrase "jumps over," setting another attribute "Underline (Double, Red)" to add a red, double underline. After that, the user enters the rest "the lazy dog" as shown in FIG. 3(C). FIG. 3(D) shows a list of attribute patterns presented to the user, which includes the patterns used in FIGS. 3(A) and 3(B). Suppose here that the user chooses the second attribute pattern "Underline (Double, Red)" from the list. FIG. 3(E) shows the resultant appearance of the text.

Figure 4:
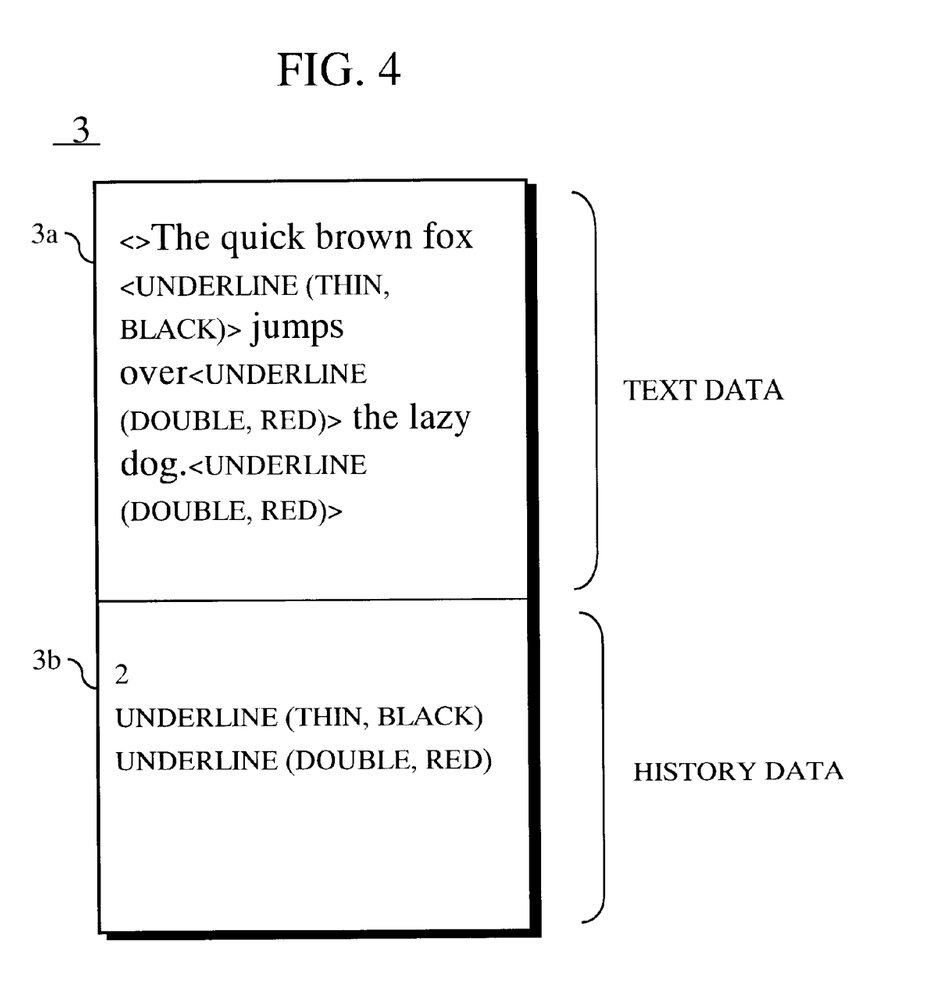
FIG. 4 is a diagram which shows a structure of a document file.

FIG. 4 presents an example of the document file 3 configured as a combination of text data 3a and history data 3b, as explained in FIG. 1(A). In this example, the text data 3a contains character strings and symbols entered by the user, together with control codes representing attribute types and their option values. Having the text interleaved with those control codes, the system automatically modifies the style of objects according to attribute specifications, when displaying or printing them.

Figure 5:
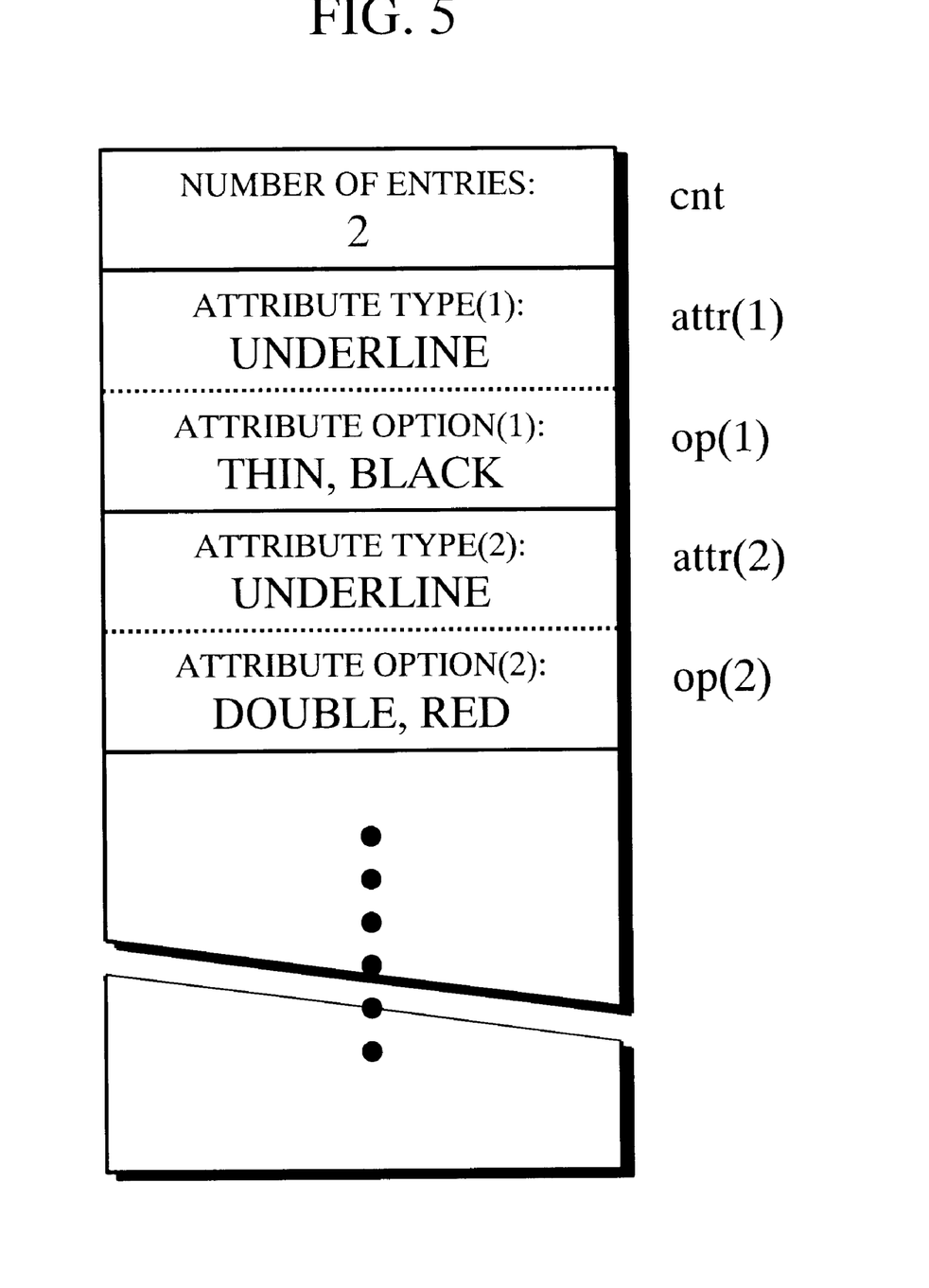
FIG. 5 is a diagram which shows a structure of history data.

The history data 3b, on the other hand, contains attribute types and options extracted from the text data 3a. FIG. 5 shows an example of this history data 3b, which holds the following data items:

The number of entries (cnt): 2
Attribute type (1): Underline
Attribute option (1): Thin, Black
Attribute type (2): Underline
Attribute option (2): Double, Red Here, two attribute patterns "Underline (Thin, Black)" and "Underline (Double, Red)" are registered automatically by the system, as a result of the user actions explained in FIGS. 3(A) and 3(B). As illustrated in this example, each entry of the history data 3b consists of an attribute type attr(i) and its option values op(i), where "i" is an integer number and "cnt" is the number of entries registered at present.

Figure 6:
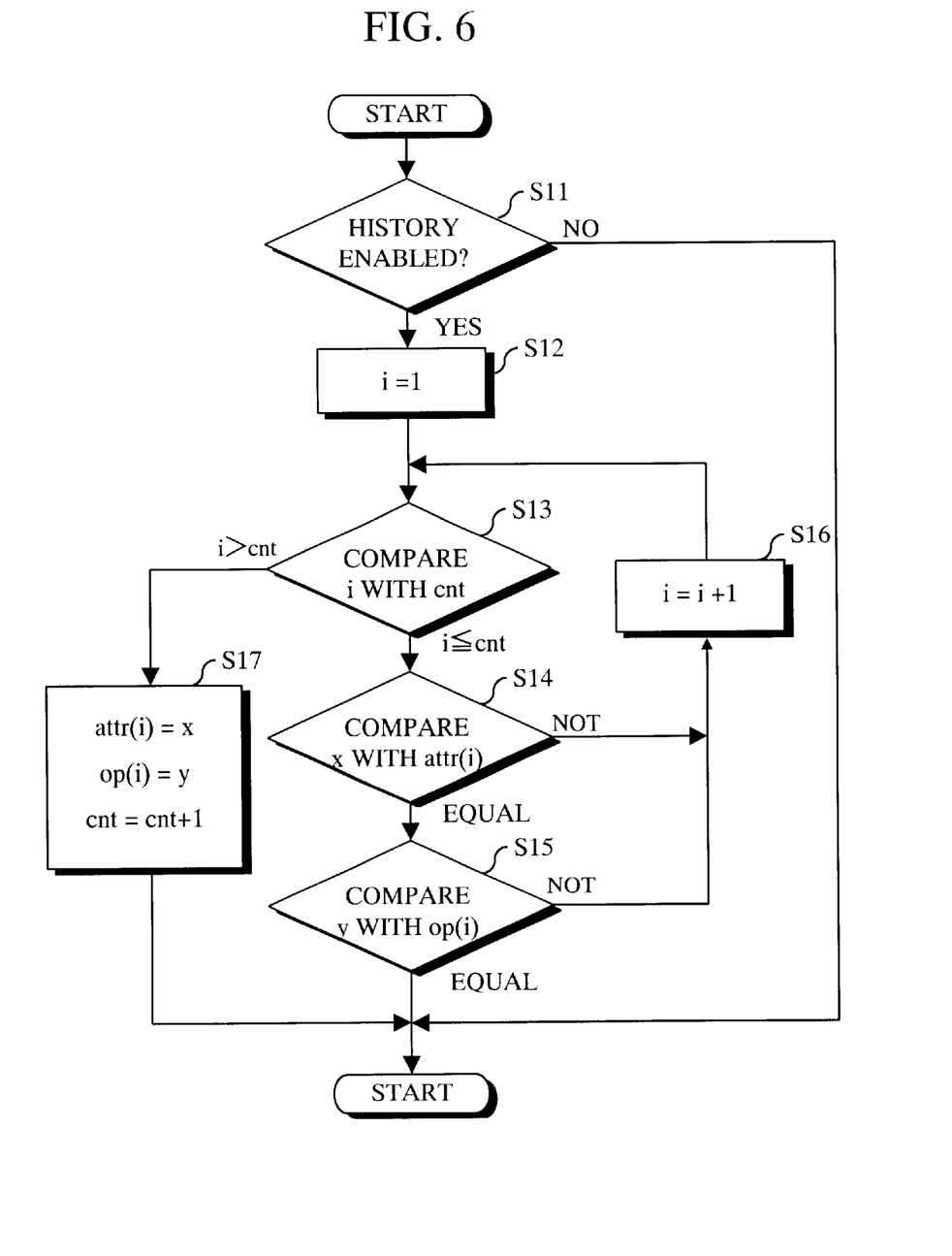
FIG. 6 is a flowchart which explains how history records are registered during the course of attribute setting.

FIG. 6 is a flowchart explaining how history records are registered. In this example, the processor 1 attempts to register an attribute pattern consisting of an attribute type x (e.g., Underline) and attribute option values y (e.g., Double, Red). The process contains the following steps:

(S11) The processor 1 checks whether the attribute history function is enabled.

(S12) A variable i, which will serve as a loop counter, is initialized to one.

(S13) The processor 1 compares the variable 1 with the number of registered entries cnt. If i is greater than cnt, the processes advances to step S17 for registration of a new entry. If i is smaller than or equal to cnt, the process proceeds to step S14.

(S14) The processor 1 compares the given attribute type x with the i-th registered entry attr(i) of the history data 3b. If the two values agree with each other, the process advances to step S15. If not, the process branches to step S16 to make a comparison with the next entry.

(S15) The processor 1 compares the given attribute options y with the i-th registered entry op(i) of the history data 3b. If the two values agree with each other, the processor 1 exits from the process of FIG. 6, because the given attribute pattern is found as an existing entry of the history data 3b. If not, the process branches to step S16 to make a comparison with the next entry.

(S16) Incrementing the variable 1 by one, the processor 1 returns to step S13 to execute the above steps again for the next entry of the history data 3b.

(S17) The processor 1 adds the given attribute pattern to the end of the history data 3b, and also increments the number of registered entries cnt by one. It registers a new entry in this way and exits from the process.

In short, the above-described process first tries to find the given attribute pattern in the history data 3b, and if no relevant record is found, it registers the attribute pattern as a new entry. The processor 1 is designed to automatically perform this data search and registration process in response to each user action of setting an attribute.

Figure 7:
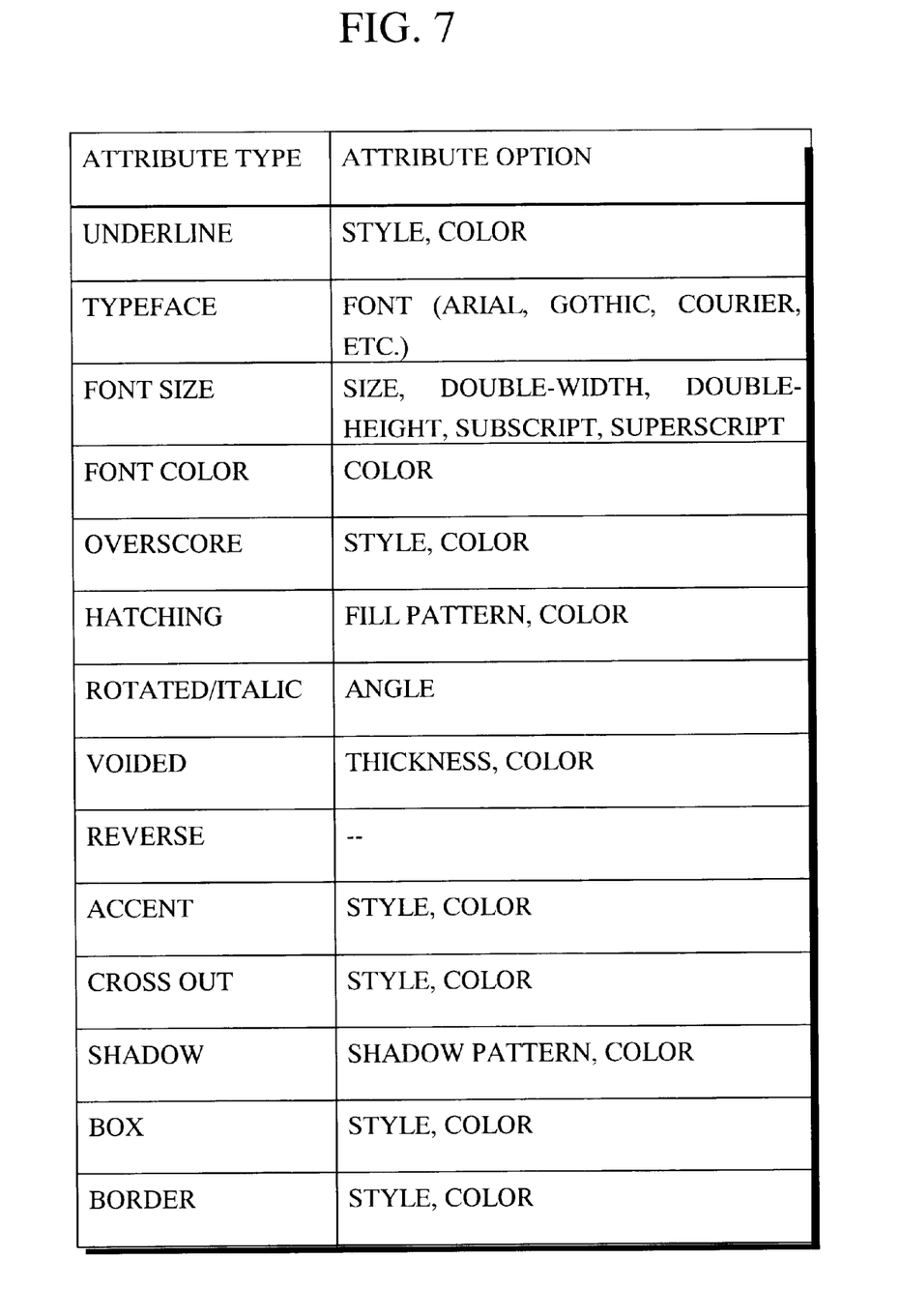
FIG. 7 is a table which shows typical attribute types and their option values concerning character strings.

FIG. 7 is a table which shows typical attribute types and their option values concerning character string objects. As already seen in this description of preferred embodiments, attribute patterns are represented in such a notation where an attribute type is followed by attribute options in parentheses.

Underline (Style, Color)
Typeface (Font)
Font size (Size, Double-width, Double-height, Superscript, Subscript)
Font color (Color)
Overscore (Style, Color)
Hatching (Fill pattern, Color)
Rotated/Italic (Angle)
Voided (Thickness, Color)
Reverse
Accent (Style, Color)
Cross out (Style, Color)
Shadow (Shadow pattern, Color)
Box (Style, Color)
Border (Style, Color)

Figure 8A:
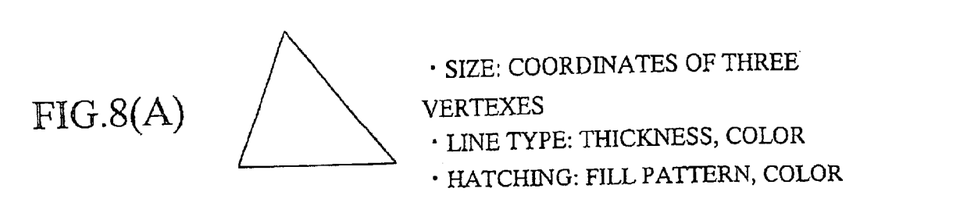
FIGS. 8(A) to 8(D) are diagrams which show examples of graphic objects being characterized by attributes.

While attributes for character strings (including individual characters and symbols) have been discussed above, the present invention is not limited to them, but also applicable to attributes for graphic objects, or figures. The following section will now present some examples of attribute patterns that define the appearance of figures. FIGS. 8(A) to 8(D) show four such examples. First, FIG. 8(A) illustrates a triangle, a two-dimensional object characterized by the following parameters:

Size: Coordinates of three vertexes
Line: Thickness, Color
Hatching: Fill pattern, Color Here, the "size" parameters define the geometry of a triangle, while the next two are attributes that determine the line and hatching types. The attribute type "Line" takes two kinds of options, "Thickness" and "Color," while "Hatching" has options "Fill pattern" and "Color."

Figure 8B:
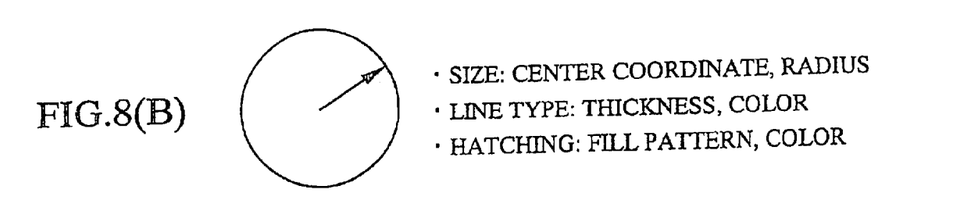
Figure 8C:
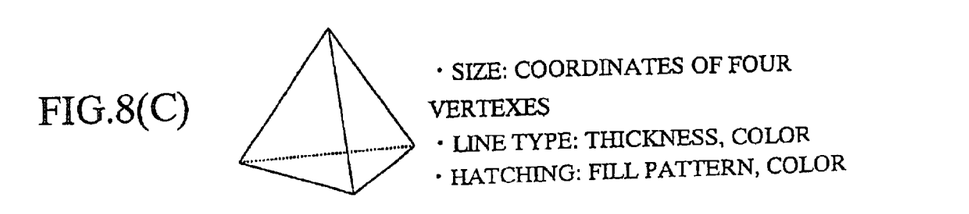
Figure 8D:
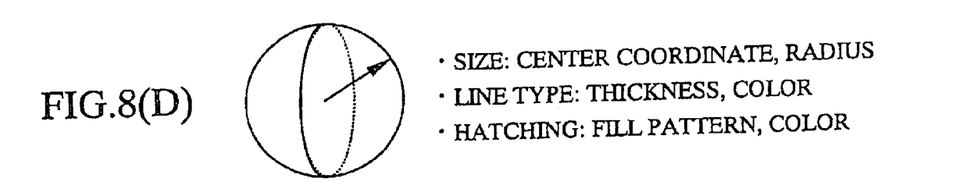

Similarly, FIG. 8(B) shows a circle as another example of two-dimensional graphic objects, which is characterized by the following parameters:

Size: Center coordinate, Radius
Line Type: Thickness, Color
Hatching: Fill pattern, Color FIG. 8(C) shows a triangular pyramid as an example of three-dimensional graphic objects, which is characterized by the following parameters:

Size: Coordinates of four vertexes
Line Type: Thickness, Color
Hatching: Fill pattern, Color FIG. 8(D) shows a sphere, another example of three-dimensional graphic objects. This sphere model is characterized by the following parameters:

Size: Center coordinate, Radius
Line Type: Thickness, Color
Hatching: Fill pattern, Color As illustrated above, various attribute patterns are available not only for character strings, but also for two-dimensional and three-dimensional graphic objects. Accordingly, the present invention can apply to those objects to set desired attribute types and option values. The processor 1 records such attribute patterns in history data 3b or history file 4. The user can refer to a list of attribute patterns for selection, after he/she has created a figure by entering or duplicating its geometry data. By choosing an appropriate attribute pattern from among the existing ones, the user can repetitively use a particular set of attributes. It is thus possible to create two-and three-dimensional graphic objects having unified appearances in a simple and reliable way.

The above-described processing mechanism of the present invention is actually implemented as software functions of a computer system. The process steps are encoded in a computer program stored in a computer-readable storage medium. The computer system executes such a program to provide the intended functions of the present invention. Preferred computer-readable storage media include magnetic storage media and solid state memory devices. Some portable storage media, such as CD-ROMs and floppy disks, are also suitable for circulation purposes. Further, it is possible to distribute programs through an appropriate server computer deployed on a network. The program file delivered to a user is normally installed in his/her computer's hard drive or other local mass storage devices, which will be executed after being loaded to the main memory.

The above description will now be summarized below. According to the present invention, all attribute patterns used in a document is recorded as history data, where each attribute pattern is composed of an attribute type and corresponding option values. The proposed attribute setting apparatus provides the user with a list of such attribute patterns, and the user can choose a desired attribute pattern from the list and set it to specified objects, including individual characters, character strings, symbols, and figures. This feature facilitates repeated use of the same attribute for different objects, thus enabling the user to quickly produce documents with a unified style.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An attribute setting apparatus for setting desired attributes to objects in a document, comprising:

recording means for recording a plurality of attribute patterns selectively from among all edit operations made to the document during a period when a history recording process is enabled;

storage means for storing history records of the plurality of attribute patterns that are set to the existing objects, each of the plurality of attribute patterns comprising an attribute type and attribute option values;

display means for displaying a list of the plurality of attribute patterns stored as the history records in said storage means; and attribute setting means for applying an attribute pattern selected from among the list of the plurality of attribute patterns displayed by said display means, to a newly entered object or one of the existing objects.

2. The attribute setting apparatus according to claim 1, wherein the storage means stores the history records in a document file, together with document data that contains the objects.

3. The attribute setting apparatus according to claim 1, wherein said storage means stores the history records in a history file that is attached to a document file storing document data that contains the objects.

4. The attribute setting apparatus according to claim 1, wherein said storage means stores document data containing the objects in a document file, while separately accumulating the history records in a history file corresponding to a plurality of instances of the document file.

5. The attribute setting apparatus according to claim 1, wherein the attribute option values include at least one of style, color, angle, and size.

6. The attribute setting apparatus according to claim 1, wherein the objects include individual characters, character strings, and symbols.

7. The attribute setting apparatus according to claim 1, wherein the objects include two-dimensional figures.

8. The attribute setting apparatus according to claim 1, wherein the objects include three-dimensional figures.

9. A computer-readable medium storing a computer program for setting attributes to given objects in a document, the computer program being designed to run on a computer system so as to cause the computer system to function as:

recording means for recording a plurality of attribute patterns selectively from among all edit operations made to the document during a period when a history recording process is enabled;

storage means for storing history records of the plurality of attribute patterns that are set to the existing objects, each of the plurality of attribute patterns comprising an attribute type and attribute option values;

display means for displaying a list of the plurality of attribute patterns stored as the history records in said storage means; and attribute setting means for applying an attribute pattern selected from among the list of the plurality of attribute patterns displayed by said display means, to a newly entered object or one of the existing objects.

10. A method for setting an attribute pattern of an object, comprising:

automatically recording a plurality of prior object attribute patterns in an object attribute pattern list selectively from among all edit operations made to the object during a period when a history recording process is enabled;

receiving a request from a user to set a present object attribute pattern of an object;

displaying the object attribute pattern list to the user;

receiving a designation of a desired one of the plurality of object attribute patterns from the user, wherein the desired one of the plurality of object attribute patterns is chosen by the user from the object attribute pattern list; and applying the desired object attribute pattern to the object.

11. The method of claim 10, wherein the prior object attribute pattern is recorded only if the object attribute pattern list does not already include the prior object attribute pattern.

12. The method of claim 10, wherein the object is a character, a character string, a symbol, a graphic object, or a figure.

13. A machine-readable medium that provides instructions, which, when executed by a machine, cause the machine to perform operations for setting an attribute pattern of an object, the operations comprising:

automatically recording a plurality of prior object attribute patterns in an object attribute pattern list selectively from among all edit operations made to the object during a period when a history recording process is enabled;

receiving a request from a user to set a present object attribute pattern of an object;

displaying the object attribute pattern list to the user;

receiving a designation of a desired one of the plurality of object attribute patterns from the user, wherein the desired one of the plurality of object attribute patterns is chosen by the user from the object attribute pattern list; and applying the desired object attribute pattern to the object.

14. The machine-readable medium of claim 13, wherein the prior object attribute pattern is recorded only if the object attribute pattern list does not already include the prior object attribute pattern.

15. The machine-readable medium of claim 13, wherein the object is a character, a character string, a symbol, a graphic object, or a figure.

16. An attribute setting apparatus for setting desired attributes to objects in a document, comprising:

a recording unit recording a plurality of attribute patterns selectively from among all edit operations made to the document during a period when a history recording process is enabled;

a storage storing history records of the plurality of attribute patterns that are set to the existing objects, each of the plurality of attribute patterns comprising an attribute type and attribute option values;

a display displaying a list of the plurality of attribute patterns stored as the history records in said storage; and an attribute setting device applying an attribute pattern selected from among the list of the plurality of attribute patterns displayed by said display, to a newly entered object or one of the existing objects.

17. The attribute setting apparatus according to claim 16, wherein said storage stores the history records in a history file that is attached to a document file storing document data that contains the objects.

18. The attribute setting apparatus according to claim 16, wherein said storage stores document data containing the objects in a document file, while separately accumulating the history records in a history file corresponding to a plurality of instances of the document file.

19. The attribute setting apparatus according to claim 16, wherein the attribute option values include at least one of style, color, angle, and size.

20. The attribute setting apparatus according to claim 16, wherein the objects include individual characters, character strings, and symbols.

21. The attribute setting apparatus according to claim 16, wherein the objects include two-dimensional figures.

22. The attribute setting apparatus according to claim 16, wherein the objects include three-dimensional figures.

23. The attribute setting apparatus according to claim 16, wherein the storage means stores the history records in a document file, together with document data that contains the objects.

* * * * *